(12) United States Patent
Turner et al.

(10) Patent No.: US 9,337,895 B2
(45) Date of Patent: May 10, 2016

(54) ELECTROMAGNETIC SURFACE WAVE GUIDING MEDIUM HAVING A FIRST SURFACE WITH COUPLING NODES REPOSITIONABLE AT ARBITRARY LOCATIONS

(75) Inventors: Janice Emily Turner, Romsey (GB); Michael Jessup, Romsey (GB)

(73) Assignee: Roke Manor Research Limited, Romsey Hampshire (GB)

( * ) Notice: Subject to any disclaimer, the term of this patent is extended or adjusted under 35 U.S.C. 154(b) by 685 days.

(21) Appl. No.: 13/607,933

(22) Filed: Sep. 10, 2012

(65) Prior Publication Data
US 2013/0064311 A1 Mar. 14, 2013

(30) Foreign Application Priority Data

Sep. 8, 2011 (GB) .................................. 1115541.3

(51) Int. Cl.
*H04B 3/52* (2006.01)
*H04B 5/02* (2006.01)
*H01P 3/10* (2006.01)
*H01P 3/00* (2006.01)

(52) U.S. Cl.
CPC .. *H04B 3/52* (2013.01); *H01P 3/00* (2013.01); *H01P 3/10* (2013.01); *H04B 5/02* (2013.01)

(58) Field of Classification Search
CPC ............. H04B 3/50; H04B 3/52; H04B 3/60; H04B 5/00; H04B 5/02
USPC ................................................ 333/240, 24 R
See application file for complete search history.

(56) References Cited

U.S. PATENT DOCUMENTS

| | | | |
|---|---|---|---|
| 2,912,695 A | | 11/1959 | Cutler |
| 4,054,255 A | * | 10/1977 | Magenheim ................ 244/134 F |
| 4,511,842 A | | 4/1985 | Moran et al. |
| 4,808,950 A | * | 2/1989 | Apostolos et al. ............. 333/157 |
| 5,652,595 A | | 7/1997 | Ahrens et al. |
| 6,211,824 B1 | | 4/2001 | Holden et al. |
| 7,307,589 B1 | | 12/2007 | Gregoire et al. |
| 7,425,922 B1 | | 9/2008 | Adams |
| 7,931,858 B1 | | 4/2011 | Gross et al. |
| 2004/0095279 A1 | | 5/2004 | Shikata et al. |

(Continued)

FOREIGN PATENT DOCUMENTS

| | | |
|---|---|---|
| GB | 718597 | 11/1954 |
| GB | 2480435 | 11/2011 |

(Continued)

OTHER PUBLICATIONS

Communication for EP12183482.4 dated Mar. 31, 2014, with European Search Report dated Dec. 6, 2013.

(Continued)

*Primary Examiner* — Benny Lee
(74) *Attorney, Agent, or Firm* — Banner & Witcoff, Ltd.

(57) ABSTRACT

An apparatus for radio communication using surface waves, the apparatus comprising: a guiding medium having a first surface suitable for the propagation of surface waves, the first surface having a reactive impedance; at least one communication node, the node having a transmitter and/or receiver coupled to a transducer, the transducer positioned on or adjacent the first surface of said guiding medium; wherein the at least one communication node is arranged to launch and/or receive surface waves, over the first surface of said guiding medium.

19 Claims, 6 Drawing Sheets

(56) References Cited

U.S. PATENT DOCUMENTS

| | | | |
|---|---|---|---|
| 2005/0093747 A1 | 5/2005 | Noro et al. | |
| 2005/0194012 A1 | 9/2005 | Ito et al. | |
| 2006/0097926 A1 | 5/2006 | Fuji et al. | |
| 2007/0267713 A1 | 11/2007 | Minakuchi | |
| 2008/0064331 A1* | 3/2008 | Washiro | 455/41.1 |
| 2008/0119135 A1* | 5/2008 | Washiro | 455/41.1 |
| 2008/0153416 A1* | 6/2008 | Washiro | 455/41.1 |
| 2009/0015499 A1 | 1/2009 | Kuroda | |
| 2010/0214183 A1 | 8/2010 | Stoneback et al. | |
| 2012/0056693 A1* | 3/2012 | Kobayashi et al. | 333/156 |

FOREIGN PATENT DOCUMENTS

| | | |
|---|---|---|
| JP | 05283971 | 10/1993 |
| JP | 2003324395 | 11/2003 |
| JP | 2008053337 | 3/2008 |
| JP | 2008206074 | 9/2008 |
| JP | 2009005223 | 1/2009 |
| JP | 2009105598 | 5/2009 |
| JP | 2010035122 | 2/2010 |
| JP | 2011087266 | 4/2011 |
| WO | 9964657 | 12/1999 |
| WO | 2004054159 | 6/2004 |
| WO | 2005096439 | 10/2005 |
| WO | 2005114776 | 12/2005 |
| WO | 2006011459 | 2/2006 |
| WO | 2007066405 | 6/2007 |
| WO | 2008109662 | 9/2008 |
| WO | 2009054397 | 4/2009 |

OTHER PUBLICATIONS

Amended Search Report under Section 17 for GB1115541.3 dated Dec. 16, 2011.
Further Search Report under Section 17 for GB1115541.3 dated Feb. 14, 2012.
Further Search Report under Section 17 for GB1115541.3 dated Feb. 15, 2012.
Further Search Report under Section 17 for GB1115541.3 dated Feb. 19, 2012.
Patents Act 1977: Search Report under Section 17(5) for GB1115541.3 dated Dec. 19, 2011.
Examination Report in CA 2,788,912 dated Aug. 15, 2014.
Patent Examination Report No. 1 in AU 2012216720 dated Dec. 20, 2013.
Hendry, J., Isolation of the Zenneck Surface Wave, Antennas & Propagation Conference (Nov. 8-9, 2010), pp. 613-616.

* cited by examiner

ELECTROMAGNETIC SURFACE WAVE GUIDING MEDIUM HAVING A FIRST SURFACE WITH COUPLING NODES REPOSITIONABLE AT ARBITRARY LOCATIONS

FIELD

The present disclosure relates to an apparatus for the transmission of electromagnetic waves. In particular, it relates to an apparatus and a method which utilise a reactive surface which is suitable for Zenneck surface wave transmission.

BACKGROUND

The theory and use of electromagnetic surface waves has been well documented. The term "surface waves" covers a broad range of electromagnetic phenomena concerning the propagation of radio waves across a surface. Specifically, a surface wave is one which interacts with a surface in order that the wave propagates across that surface. In the field of radio transmission, the interaction between radio waves and the poorly conductive surface of the earth is commonly referred to as surface wave propagation.

In the field of radio transmission, the use of surface waves to transmit radio signals over long distances is well known. One of the characteristics of a surface wave, which makes it suitable for radio transmission, is the ability of the wave to "cling" to the surface, and therefore follow the curvature of the earth. This is in contrast to typical electromagnetic propagation, which generally propagates in a straight line.

Within the field of surface waves, there are a number of different electromagnetic phenomena which result in different types of surface waves. One phenomenon by which radio waves propagate across the surface of the earth is known as the Norton surface wave. The Norton surface wave is the component of the electromagnetic field closest to the homogeneous conducting ground when an electromagnetic wave is launched over it. This may be done, for example, by a dipole. The Norton surface wave requires a space wave component above the surface to exist. As noted above, there are a number of technologies that claim to utilise Norton surface waves for "over-the-horizon" communications and radar.

SUMMARY OF THE INVENTION

In a first aspect, the present disclosure provides a system for the transmission of electromagnetic surface waves, the system comprising: a guiding medium having a first surface, the first surface having an electrical reactive impedance suitable for the propagation of electromagnetic surface waves; at least two wave coupling nodes, the nodes each having a transmitter and/or receiver coupled to a transducer, the transducer positioned on or adjacent the first surface of said guiding medium; wherein the at least two wave coupling nodes arranged to launch and/or receive surface waves over the first surface of said guiding medium; wherein the wave coupling nodes may be placed at arbitrary locations on the first surface of the guiding medium.

In a second aspect, the present disclosure provides an article of clothing incorporating the first aspect described above.

In a third aspect, the present disclosure provides an article of furniture incorporating the first aspect described above.

In a fourth aspect, the present disclosure provides a building, vehicle or other vessel incorporating the first aspect described above.

In a fifth aspect, the present disclosure provides a wave coupling node comprising: a transmitter and/or receiver; a dielectric layer having first surface constituting a first surface of the node; a conductive layer, having a first surface positioned on or adjacent a second surface of the dielectric layer; a metallic plate, positioned on the first surface of the dielectric layer; and a feed line, coupling the transmitter and/or receiver to the metallic plate.

Additional aspects are described in the description below and in the figures.

BRIEF DESCRIPTION OF THE DRAWINGS

The present disclosure will now be described by way of example only, with reference to the accompanying drawings in which.

DETAILED DESCRIPTION OF THE INVENTION

Figure 1:
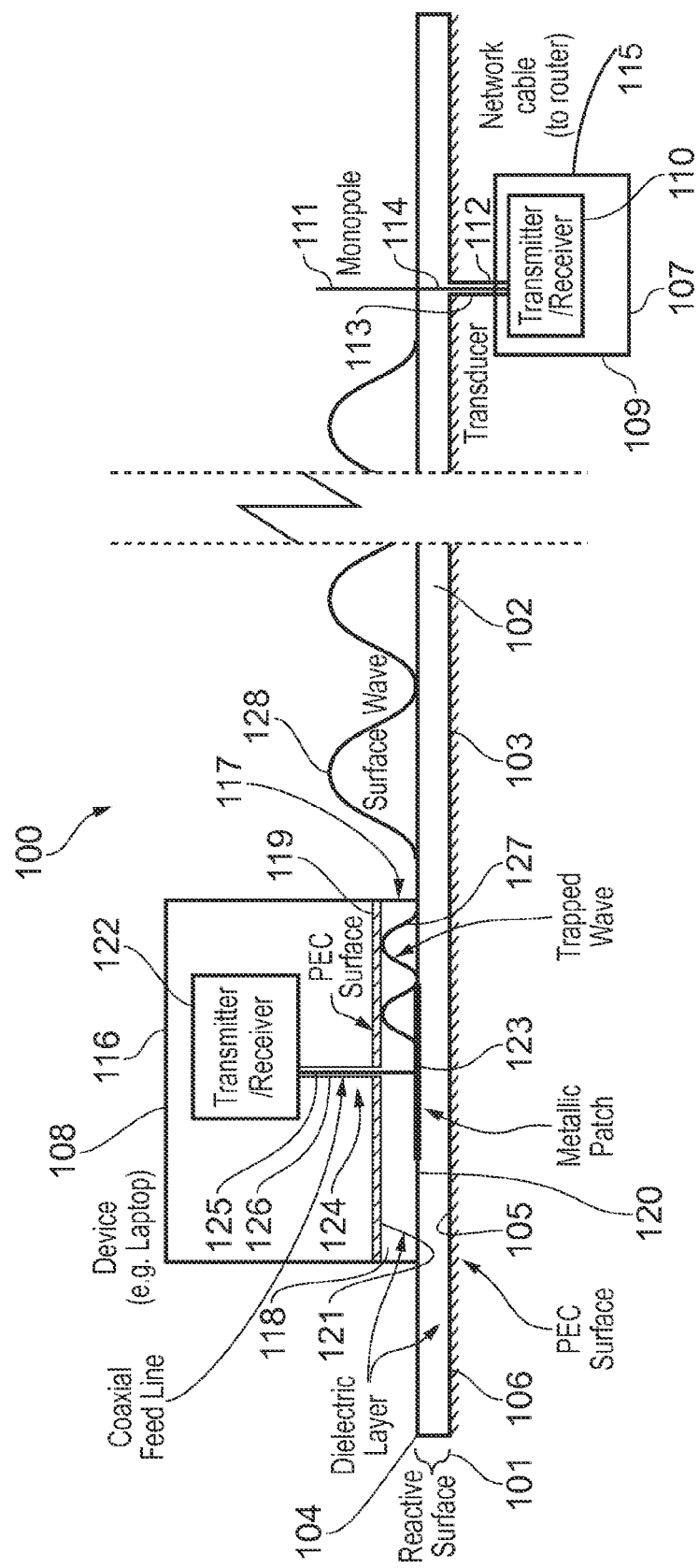
FIG. 1 shows an apparatus in accordance with a first embodiment of the disclosure.

A first embodiment of the disclosure will be described in connection with FIG. 1. FIG. 1 shows a radio frequency (RF) communication system 100. The communication system 100 includes a guiding medium 101 which includes a dielectric layer 102 and a conductive layer 103 (e.g., a perfect electrical conductor (PEC) surface). The dielectric layer 102 may take the form of a sheet of material having a uniform thickness. The width and length of the dielectric layer 102 may vary depending on the specific application. An upper surface 104 of the dielectric layer 102 is the surface over which surface waves are transmitted, as will be described in more detail below. The conductive layer 103 may also take the form of a sheet of material having a uniform thickness. The width and length of the conductive layer 103 are generally the same as those equivalent dimensions of the dielectric layer 102. An upper surface 105 of the conductive layer 103 is positioned against a lower surface 106 of the dielectric layer 102. The dielectric layer 102 and the conductive layer 103 accordingly form a dielectric coated conductor.

The upper surface 104 of the dielectric layer 102, and hence the guiding medium 101, is a reactive surface which has a reactive impedance greater than its resistive impedance. Such a surface is suitable for guiding surface waves. In particular, the reactance and resistance is such that the surface is suitable for guiding Zenneck surface waves. The layer of air formed above the guiding medium acts as the transmission medium for the surface wave. Further details of the characteristics of the surface which make it suitable for guiding of Zenneck surface waves will be provided below.

The system 100 may also include two or more communications nodes. The nodes are arranged to communicate with each other using surface wave transmission, over the guiding medium 101. In the embodiment shown in FIG. 1, the system includes a fixed communication node 107 and a moveable communication node 108. As an alternative, the system 100 may include two or more fixed communication nodes, two or more moveable communications nodes, or a combination of both types of communication node. A moveable communications node is one which is not fixed in one place, and may easily be moved around the guiding medium 103.

The fixed communication node 107 includes fixed node main unit 109 which houses the primary components of the fixed communication node 107. The fixed node main unit 109 is located on the opposite side of the conductive layer 103 to the dielectric layer 102. The fixed node main unit 109 may be attached to the lower surface of the guiding medium, for example using an adhesive. The fixed communication node 107 also includes a transmitter/receiver 110 and a transducer 111. In the present case, the transducer 111 is a monopole antenna. The transmitter/receiver 110 is located within the fixed node main unit 109. The transmitter/receiver 110 is coupled to the transducer 111 using a coaxial feed line 112. The coaxial cable 112 includes an outer conductor 113 and an inner conductor 114. The outer conductor 113 is coupled directly to the conductive layer 103. The inner conductor 114 is coupled to the transducer 111.

At the point where the transducer 111 is coupled to the inner conductor 114, the transducer passes through the dielectric layer 102 and protrudes from the upper surface 104 of the dielectric layer. The transducer 111 is perpendicular to the upper surface 104 of the dielectric layer 102. The length of the portion of the inner conductor 114 which protrudes from the dielectric layer 102 is less than a quarter wave length at the operating frequency of the system 100. The actual length will be dependent on the surface impedance produced by the guiding medium 103. Accordingly, the transmitter/receiver 110 is able to transmit and receive signals via the monopole antenna 111. The fixed communication node 107 is coupled to an external communication device, such as a router, via network cable 115. The fixed communication node includes further circuitry (not shown) which enables the node to communicate with an external device, such as a router. The fixed communication node 107 also includes a modulator and a demodulator (not shown). The modulator is for modulating the transmitted signal with a signal received from the external device. The demodulator is for demodulating a signal received by the fixed communication node 107.

The moveable communication node 108 may form part of a mobile computing device such as a laptop. The moveable communication node 108 may be formed as an integral part a mobile computing device, or may be connected thereto using a communications cable or other communications method. The moveable communication node 108 is shown in FIG. 1 having a moveable node main unit 116. The movable communication node 108 includes a moveable node transmission medium 117 which is located at a lower end of the moveable node 108. The node transmission medium 117 includes a dielectric layer 118 and a conductive layer 119 (e.g., a PEC surface). The dielectric layer 118 is in the form of a sheet of dielectric material, having a similar uniform thickness to that of the dielectric layer 102. The extent of the sheet of dielectric material is the same as that of the moveable main unit 116. A lower surface 120 of the dielectric layer 118 is exposed and is arranged to come into close contact with the upper surface 104 of the dielectric layer 102 of the guiding medium 101. An upper surface 121 of the dielectric layer 118 is covered in the layer of conductive sheet material 119.

The moveable node 108 includes a transmitter/receiver 122 and a metallic patch antenna 123 (e.g., metal plate). The transmitter/receiver 122 is housed inside the moveable node main unit 116. The transmitter/receiver 122 is coupled to the metallic plate antenna 123 by a coaxial feed line 124. The coaxial feed line 124 includes an inner conductor 125 and an outer conductor 126. The metallic patch antenna 123 is attached to a lower surface 120 of the dielectric layer 118. The inner conductor 125 of the coaxial feed line 124 passes through the dielectric layer 118 and is coupled directly to the metallic patch antenna 123. The outer conductor 126 is coupled to the conductive layer 119. In use, the dielectric layer 118 of the movable communication node 108 is placed flat against the dielectric layer 102 of the guiding medium 101.

The operation of the system 100 will now be described. When the movable communication node 108 is acting as a transmitter, the transmitter/receiver 122 sends a modulated signal to the metallic patch antenna 123. This causes a trapped electromagnetic wave 127 to be formed within the dielectric layer 118 between the dielectric layer 102 and the conductive surface 119. When this wave reaches the end of dielectric layer 118, it propagates outwards. In particular, the electromagnetic wave forms a Zenneck surface wave 128 which travels across the surface of the guiding medium 101. In this example, the trapped wave 127 and the Zenneck surface wave 128 as shown for representative purposes only, and are not intended to be accurate representations of those waves. The Zenneck surface wave 128 propagates across the guiding medium in all directions, and is received by the transducer 111 of the fixed communication node 107. The exposed inner conductor 114 of the fixed communication node 107 is excited by the surface wave 128. The signal detected by the transducer 111 is received by the transmitter/receiver 110. Accordingly, the system utilises Zenneck surface waves to provide communication between different communication nodes across the guiding medium 101. Further details of the guiding medium and communications nodes will be provided below.

The system 100 may be deployed in a building or on furniture. For example, walls and/or desks may be covered in the guiding medium 101. A laptop or mobile phone may be coupled to a communication node in order to communicate with other devices or a fixed communication node. A laptop incorporating a communication node may be placed anywhere on a desk covered with the guiding medium 101, and would be able to communicate with other devices on the desk or with the fixed node 107. As noted above, the fixed node 104 may communicate with a central server. Alternatively, the guiding medium 101 may cover a wall which is covered in a magnetic surface. A communication node, also covered in a magnetic surface, may be attached to the wall. The node may then be coupled to a computing device using a cable connection (for example a retractable cable). Alternatively, the communication node could include a WiFi unit, and could communicate with local devices using WiFi. One of the benefits of this system is that wireless communications is provided across a wall, within a building, that could not be intercepted from the outside by a third party.

In another example, the system 200 may be deployed on a groundsheet for use in a tent. A table would also have the reactive surface applied to its top surface. The legs of the table would act as a communications link between the groundsheet and the table top. For example, a cable may run through the table legs, which may couple with fixed communications nodes on the table top. At the bottom of the legs, the cable may be coupled to a communication node which is attached to the ground sheet using a magnetic layer, for example. An advantage of this system is that a communication channel would be provided through the tent that suitably equipped devices could communicate through. Again, this would provide wireless communications within the tent that could not be intercepted by third parties from the outside.

Figure 2:
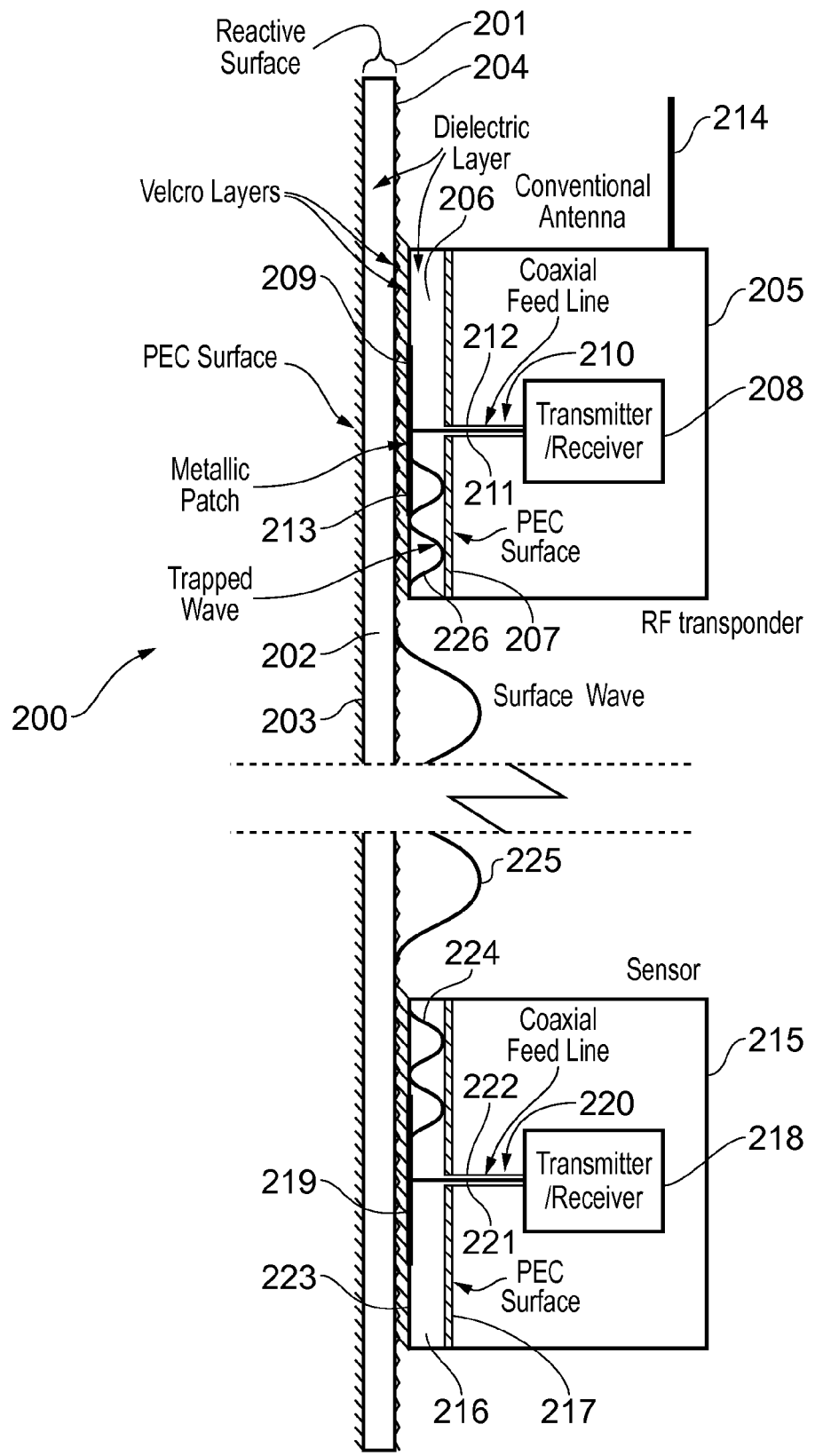
FIG. 2 shows an apparatus in accordance with a second embodiment of the disclosure.

FIG. 2 shows a second embodiment of the present disclosure. FIG. 2 shows a radio communication system 200. The system 200 includes a guiding medium 201 which has a dielectric layer 202 and a conductive layer 203 (e.g., a PEC surface). The outer surface of the dielectric layer 202 has a reactive surface. The system 200 also includes a hook-and-loop fastener layer 204 which may, for example, be VEL-CRO®. The purpose of this layer is to enable movable communication nodes to be easily attached to the guiding medium 201.

The system 200 includes a first movable communication node 205. As will be described in the following, the movable communication node 205 is similar to the removable communication node 108 shown in FIG. 1. The node 205 includes a dielectric layer 206 and a conductive layer 207 (e.g., a PEC surface). In addition, the node 205 includes a transmitter/receiver 208 which is coupled to a metallic patch antenna 209 via a coaxial feed line 210. The coaxial feed line 210 has an inner conductor 211 and an outer conductor 212. These components are coupled in the same way as the corresponding components in removable node 108 shown in FIG. 1.

The node 205 also includes a hook-and-loop fastener layer 213 which is attached to the node 205 over the outer surface of the dielectric layer 206 and the metallic patch antenna 209 (e.g., metallic plate). In use, the node 205 may be placed against the reactive surface of guiding medium 201 and will adhere to that surface by virtue of the hook-and-loop fastener layers. The node 205 may be an RF transponder which communicates with an external source using antenna 214 (e.g., a conventional antenna).

The system 200 includes a second removable communication node 215 which may incorporate a sensor. The node 215 includes a number of the same components as the node 205. In particular, the node 215 includes a dielectric layer 216 and a conductive layer 217 (e.g., a PEC surface). The node 215 also includes a transmitter/receiver 218 which is coupled to a metallic plate 219 via a coaxial feed line 220. The coaxial feed line 220 includes an inner conductor 221 and an outer conductor 222. Finally, the node 215 includes a hook-and-loop layer 223.

Operation of the system 200 will now be described. The node 215 may incorporate a sensor such as a heart rate monitor which provides data to the transmitter/receiver 218 to transmit information to the RF transponder 205. The transmitter/receiver 218 excites the metallic plate 219 causing a trapped wave 224 to be formed in the dielectric layer 216. At the end of the dielectric layer 216 the trapped surface wave 224 causes a surface wave 225 to be transmitted across the reactive surface of guiding medium 201. When the surface wave 225 hits the dielectric layer 206 of the node 205, a trapped wave 226 is formed in the dielectric layer 206. This excites the metallic patch antenna 209 which is received by transmitter/receiver 208. This signal may then be transmitted via the antenna 214 to an external source.

In the second embodiment, the dielectric layer 202 and the conductive layer 203 may be deformable. For example, the conductive layer 203 may be a woven conductive mesh, and the dielectric layer 202 may be neoprene. These layers may form part of an article of clothing. The communications nodes may be relocated at arbitrary positions on the surface of the reactive surface. One of the advantages of this arrangement is that the guiding medium is not, and does not require to be modified by the communications nodes. A more comfortable layer can be placed on the conductive layer against the user's skin.

As noted above, the communication node 215 may include a sensor. In one embodiment, the system 200 may include a number of communications nodes, each having its own sensor. These sensors may be positioned across the body to measure parameters like heart rate and blood pressure. The system can therefore be used to monitor the health of a patient, fire-fighter or athlete. The sensors communicate with the central communication node 205. The central node relays this data back to a central database via antenna 214. One of the benefits of this system is that there are no wires to restrict movement and devices can be added or removed arbitrarily.

The system 200 of the second embodiment may also include sensors which monitor an external device. For example, the external device may be a motorbike. Sensors on the bike measure the amount of fuel remaining in the petrol tank, tire pressures, engine temperature etc. These sensors are coupled to a communication node which may be attached to the clothing of the rider, which incorporates the system 200. In addition, the rider's helmet may include a heads-up display which is also coupled to a communication node on the rider's clothing. The sensors and heads-up display would communicate with each other so that the data collected by the sensors is displayed on the heads-up-display. In addition, the sensors relay their data to the central node 205 so that the data can be sent back to a base. Again, an advantage of this system is that it is wireless, so there are no wires to snag. Furthermore, as there are no connectors, there is no need to worry about connecting connectors or connectors becoming disconnected. Again, the devices can be repositioned at arbitrary locations across the item of clothing. Another advantage of the system is that communications channel is close to the body, reducing interference with adjacent systems and minimising the chance of detection by a third party.

Current solutions use either wired or radiating mechanisms to communicate signals around the body. Wired systems can break and snag on things in the environment. They also have bulky connectors and limit where devices can be placed on the body. Radiated systems have difficulty with non line-of-sight connections, particularly at high frequencies (for example above 10 GHz) required for high bandwidths. These radiated systems can also be intercepted and can suffer from interference. The system of the present disclosure addresses all of these problems.

One of the advantages of the system 200 is that Zenneck waves travel along the surface, even when the surface is not flat. This enables flexible positioning of devices, for example out of line-of-sight, without the use of connectors. The system does not include wires which may snag on things in the environment. Furthermore, it provides a secure, reliable datalink, that is effectively immune to interference.

In the above embodiments, transducers which are radial waveguides have been described. The system may use patch antennas, monopole antennas or dipole antennas as transducers. The antenna must be aligned for its polarisation to match the polarisation of the surface wave being transmitted/received. The distance that the transducer needs to be from the reactive surface varies according to the application. For example, the thickness of the dielectric forming the surface and the frequency of transmission affect the position of the transducer.

Figure 3:
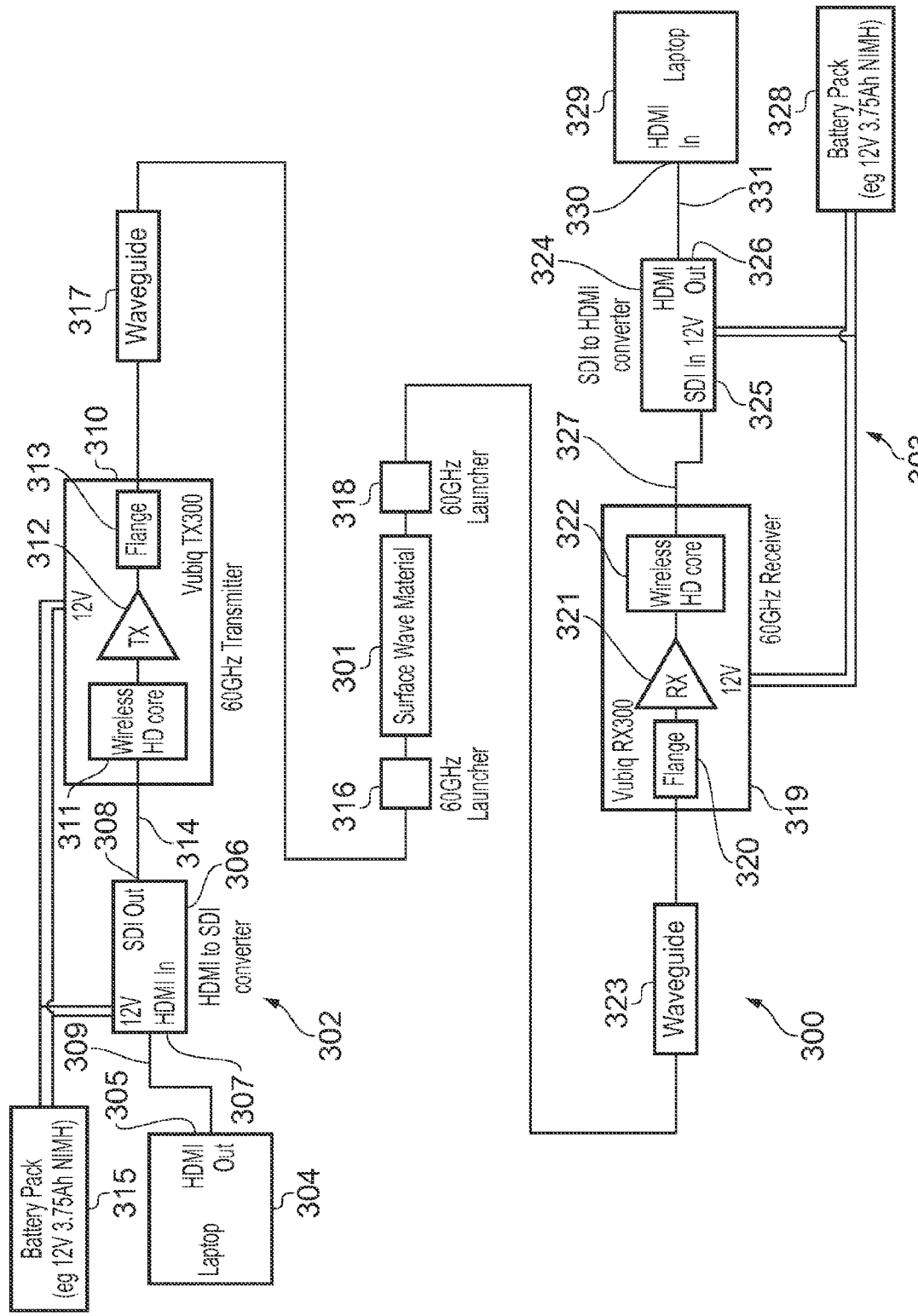
FIG. 3 shows a system in accordance with a third embodiment of the disclosure.

FIG. 3 is a schematic diagram of a radio frequency (RF) communication system in accordance with a third embodiment of the present disclosure. FIG. 3 shows a radio frequency (RF) communication system 300. The communication system 300 includes a surface wave guiding medium 301 which includes a dielectric layer and a conductive layer. The system 300 also includes a transmitter unit 302 and a receiver unit 303. In practice, the transmitter unit 302 may also act as receiver unit, and the receiver unit 303 may also act as a transmitter unit.

The transmitter unit 302 includes a laptop computer 304 which has a High-Definition Multimedia Interface (HDMI) output port 305. The laptop computer 304 acts as a source of signals to be sent over the surface wave material 301. The transmitter unit 302 also includes an HDMI to Serial Digital Interface (SDI) converter 306. The HDMI to SDI converter 306 includes an HDMI input port 307 and an SDI output port 308. The HDMI output port 305 of the laptop 304 is coupled to the HDMI input port 307 of the HDMI to SDI converter 306 via cable 309. The transmitter unit 302 also includes a 60 GHz transmitter 310. The 60 GHz transmitter 310 may for example be a VUBIC® TX300. The 60 GHz transmitter 310 includes a wireless HD core 311, a transmission (TX) amplifier 312 and a flange 313 suitable for coupling to a waveguide. SDI output port 308 is coupled to the wireless HD core 311 via cable 314. The transmitter unit 302 also includes a battery pack 315 which provides a 12v power supply to the HDMI to SDI converter 306 and the 60 GHz transmitter 310. The transmitter unit 302 also includes a 60 GHz launcher 316. The 60 GHz transmitter 310 is coupled to the 60 GHz launcher 316 via a waveguide 317. The 60 GHz launcher 316 is coupled to the surface wave material 301.

The receiver unit 303 includes a set of components which correspond to those of the transmitter unit 302. The receiver unit 303 includes a 60 GHz launcher 318 which is coupled to the surface wave material 301. The receiver unit 303 includes a 60 GHz receiver 319 which includes a waveguide coupling flange 320, a receiving (RX) amplifier 321 and a wireless HD core 322. The receiver unit 303 also includes a waveguide 323 which is coupled between the 60 GHz launcher 318 and the flange 320. The receiver unit 303 also includes an SDI to HDMI converter 324 which includes an SDI input port 325 and an HDMI output port 326. The wireless HD core 322 is coupled to the SDI input port 325 by cable 327. The receiver unit 303 also includes a battery pack 328 which provides a 12 v 3.75 Ah, NIMH power supply to the 60 GHz receiver 319 and the SDI to HDMI converter 324. The receiver unit 303 also includes a laptop computer 329 which includes an HDMI input port 330. The HDMI output port 326 and the HDMI input port 330 are coupled together by cable 331.

In operation, the laptop 304 transmits a signal to the HDMI to SDI converter which is converted to SDI before being forwarded to the 60 GHz transmitter. From here the signal is transmitted to the 60 GHz launcher 316 where a surface wave is generated on the surface wave material 301 as described above in connection with FIGS. 1 and 2. The surface wave is received by the 60 GHz launcher 318 where it is transmitted to the 60 GHz receiver 319. From here the signal is converted to HDMI via the HDMI to SDI converter 324 before being forwarded to the laptop computer 329.

Figure 4:
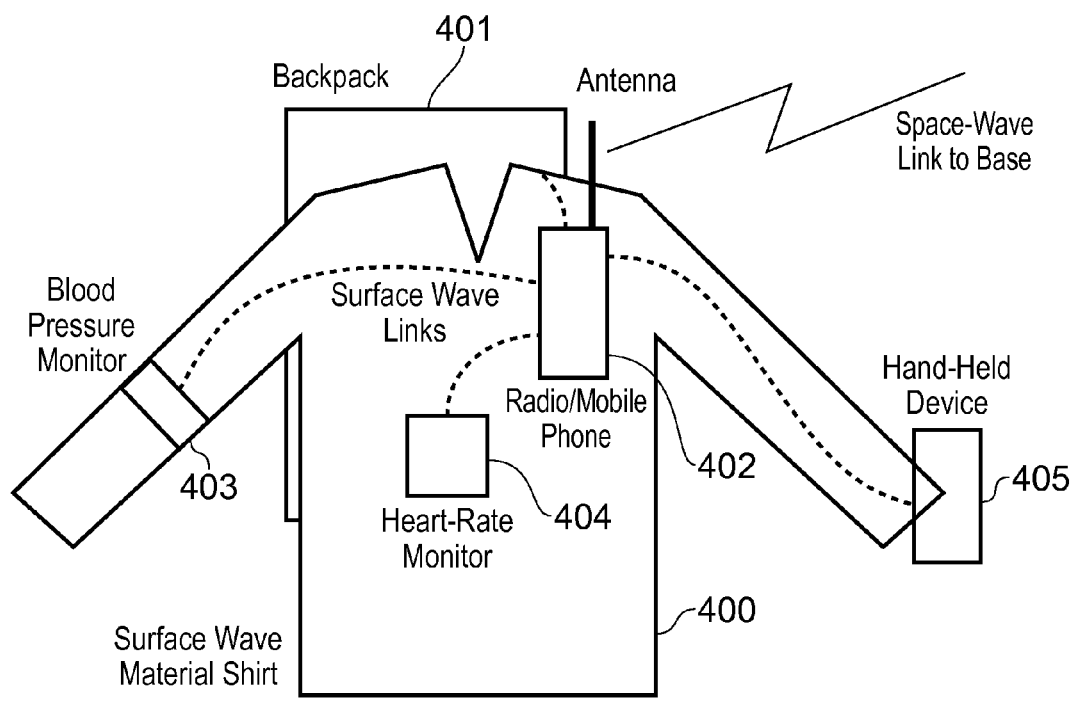
FIG. 4 shows an article of clothing in accordance with an embodiment of the present disclosure.

FIG. 4 shows a system in accordance with the present disclosure in which the disclosure is incorporated within an article of clothing 400. The article of clothing 400 is made of a material which is suitable for carrying surface waves (e.g., a surface wave material shirt). The system includes various components including a backpack 401, a radio/mobile phone 402, a blood pressure monitor 403, a heart rate monitor 404 and a handheld device 405. Each of these components includes all of the necessary components to launch a surface wave onto the clothing item 400. The radio/mobile phone 402 may include an antenna which provides a space-wave link to a base. As can be seen, the various components may communicate with each other over the surface of the item of clothing.

To be clear, the hash line shown between the various components represent surface waves along surface wave links rather than cables or other wiring.

Figure 5:
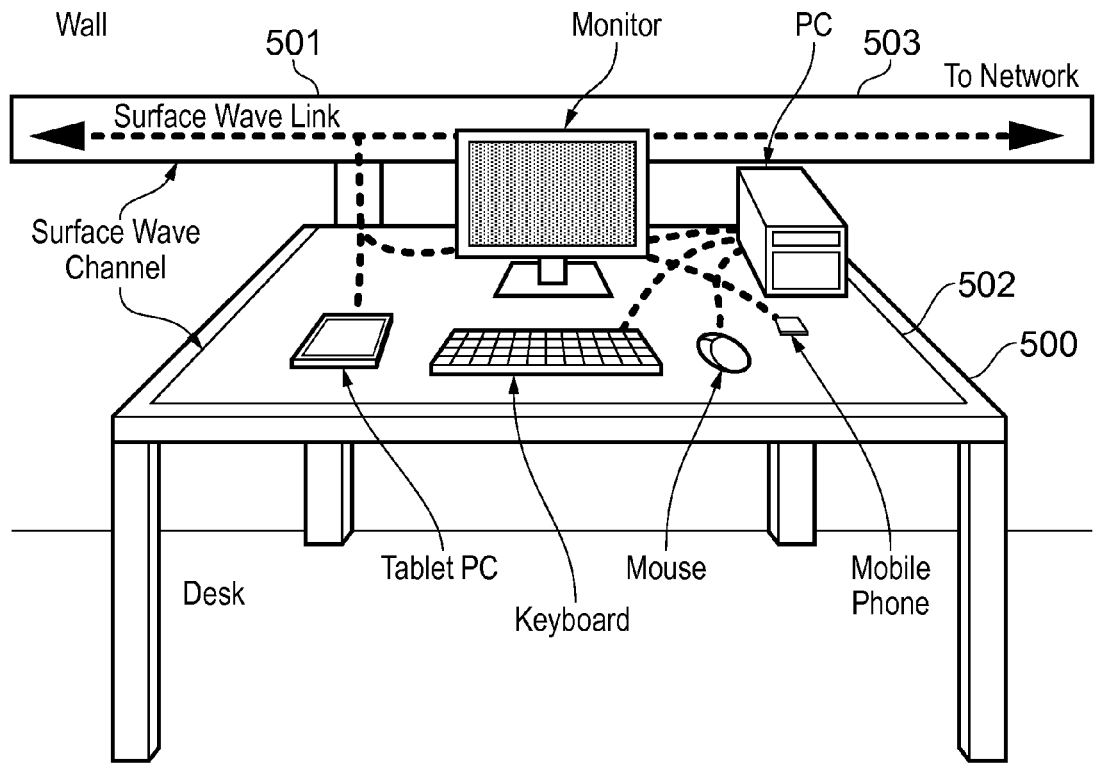
FIG. 5 shows an article of furniture in accordance with an embodiment of the present disclosure.

FIG. 5 is an embodiment of the present disclosure in which the system is implemented on an item of furniture 500 and a wall 501. The item of furniture 500 (e.g., a desk) and the wall 501 are covered in a reactive surface suitable for surface wave transmission. This is shown as the surface wave channel 502 and 503. As can be seen, various components (e.g., a personal computer (PC), a tablet PC, a keyboard, a mouse, a monitor, a mobile phone) placed on the table may communicate with each other and to a network or other devices via a surface wave channel through surface wave links.

Figure 6:
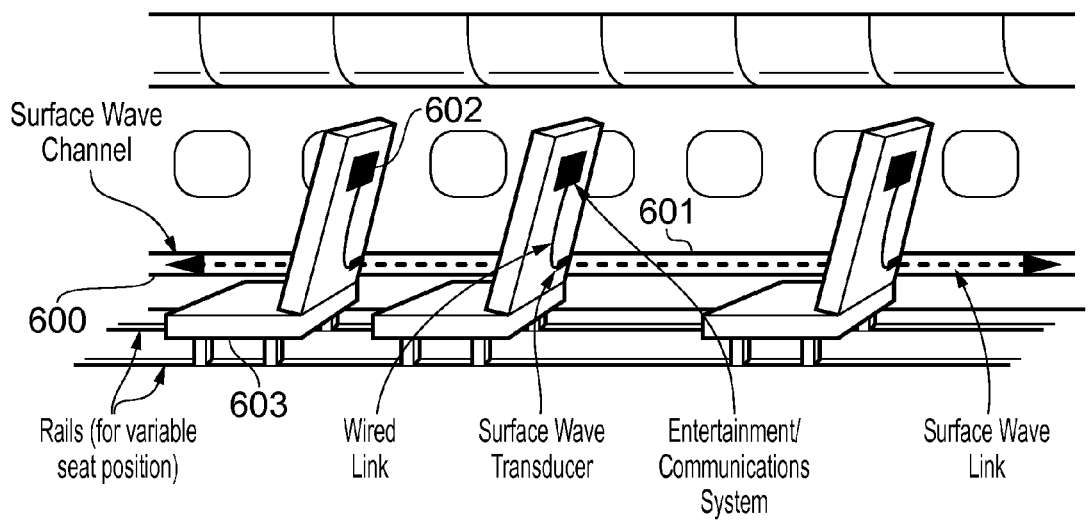
FIG. 6 shows an vehicle in accordance with an embodiment of the present disclosure.

FIG. 6 shows an embodiment of a present disclosure in which the system is implemented in a vehicle, in this case an aircraft. In this case, a surface wave channel 600 is placed along the wall of the aircraft 601. As can be seen, an entertainment/communications system 602 on the rear of each seat 603 has been arranged to communicate with a central system via surface wave links along the surface wave channel 601. The entertainment/communication system 602 may be connected with a wired link to a surface wave transducer that is in contact with the surface wave channel. Variable seat position may be provided by rails under the seats.

Further details of the guiding medium introduced above will now be provided. In the above embodiments, the method of transmission is via Zenneck Waves or H-Surface waves (magnetic analog of Zenneck Waves that are polarised parallel to the surface). The system described above is designed to utilise Zenneck surface wave propagation for RF transmission applications. Conventional RF transmission is unguided in three dimensions through free space or guided in one dimension using conductors. The Zenneck surface wave is unusual in that it can be guided in two dimensions using a carefully designed surface. Before describing some of the physical parameters of the guiding medium introduced above, it is important to distinguish between the different types of surface waves which are collectively referred to as "surface waves".

Norton surface waves have been mentioned above. The Norton surface wave is simply the component of electromagnetic field closest to a homogeneous conducting ground when an electromagnetic field is launched over it, for example, by a dipole. The Norton surface wave requires the space wave component above the surface to exist. There are a number of technologies that claim to utilise surface waves for "over-the-horizon" detection and communications. These are utilising the Norton surface wave.

Creeping waves are waves that appear to "creep" around corners such as around the surface of a metallic cylinder or sphere. These waves are a result of the diffraction of the space wave around the obstacle.

Trapped surface waves occur in dielectric materials when the wave is launched into the dielectric. Total internal reflection of the wave prevents it from escaping. This means that the wave can be guided inside the dielectric to another point where the geometry of the guiding structure allows it to escape, in a similar manner to the way in which optical fibres function.

Zenneck surface waves are self-supporting electromagnetic fields that propagates over a high reactance surface (inductive or capacitive). It propagates parallel to the surface with the field decaying exponentially perpendicular to the surface. How quickly it decay away from the surface is determined by the surface reactance. It is this wave that is utilised in this disclosure.

The Zenneck surface wave can be supported by a number of surfaces, including a corrugated conductive surface, a conductive surface coated with a layer of dielectric or a metamaterial such as the Sievenpiper high impedance surface. A suitable transducer, such as the monopole antenna noted above, may be arranged to launch a surface wave over the surface. That wave can be intercepted by another transducer.

One of the advantages of using surfaces which are able to sustain Zenneck waves, is that a Zenneck wave can remain open to free space. In order to cause a normal electromagnetic wave to propagate along a surface, a pair of parallel plates can be used, which act as a 2D waveguide with the trapped wave propagating between them. However, any nodes would have to be located between the plates. This would mean having holes where the data cable exits the plates or having the nodes at the edges of the plates. If the plates were replaced by a mesh, there would still be the complexity of separating the mesh with dielectric and then introducing a node. This would deform the dielectric or require holes to be fixed therein. By contrast, the Zenneck surface wave is open to free space, allowing nodes to be added easily. The nodes do not even need to be in direct contact with the surface (although they should be close to it).

One of the advantages of a system utilising Zenneck waves, is that they are bound to the surface and do not radiate away from the surface. Accordingly, Zenneck waves do not interfere with traditional wireless communications. As the frequency spectrum is currently heavily loaded with a limit on the bandwidth allowed for communications, any system which does not interfere with traditional communications system is advantageous.

Another advantage of Zenneck waves is that they can provide a large bandwidth and high data rates at microwave frequencies.

In order for the systems described above to utilise Zenneck waves, a channel for propagation of the Zenneck wave in E or H modes must be provided. The channel creates an artificial surface impedance and need not be flat or straight. In the above examples, we have described the use of a dielectric layer and conductive layer combination. However, other embodiments are possible, as will be described in the following. Here, three primary guiding mediums are described: a dielectric-coated conductor (as described above), corrugated conductor (with or without a dielectric coating) and the Sievenpiper high impedance surface.

It has been found that that a surface reactance of approximately 50 Ohms to 1000 Ohms is optimum for transmission of Zenneck waves, if a wide bandwidth is required. Any suitable dielectric can be used for this purpose. For example, a 3 mm thick layer of neoprene backed with aluminium foil could be used for clothing applications at around 30 GHz. The resistance of the surface should as low as possible. In the case of a dielectric coated conductor, the dielectric should be low loss and the conductor should have as high a conductivity as possible (such as copper or aluminium). Low loss usually means having a high air content. However, this must be balanced against the relative dielectric constant, which needs to be high to make the material thinner, whereas air has a low dielectric constant. Many plastics such as PTFE would be potential candidates depending on the application. A reactance outside of this band can still support a Zenneck surface wave, but at lower bandwidths.

A dielectric coated conductor can be designed using the following equation:

$$Z_s = \left(\frac{1}{2}\omega\mu_o\Delta\right) + \left(\omega\mu_o\left[\left(\frac{\varepsilon_r - 1}{\varepsilon_r}\right)\right]l + \frac{1}{2}\Delta\right)$$

where Zs is the surface impedance, ω is the angular frequency, µo is the permeability of free space, Δ is skin depth of conductor (conductor depth should be greater than the skin depth), $\varepsilon_r$ is relative permittivity of the dielectric and l is depth of dielectric.

The surface impedance of corrugated conductor is given by the following equation:

$$Z_s = R_s + jZ_w\left(\frac{d}{D}\right)\tan\left(\frac{2\pi h}{\lambda}\right)$$

where, Zs is the surface impedance, Rs is the surface resistance (normally close to zero for a good conductor), Zw is the characteristic wave impedance for groove (i.e. 377 Ohms for air, varies for different dielectric coatings), d is the width of a trough (d≤h), h is the height of trough and D is the width of trough plus width of ridge (3D≤λ).

Careful consideration must be given to the choice of d, D and h as the mechanical tolerances associated with these varies for different combinations. Having d and h as similar as possible may provide better tolerance specifications.

Figure 7:
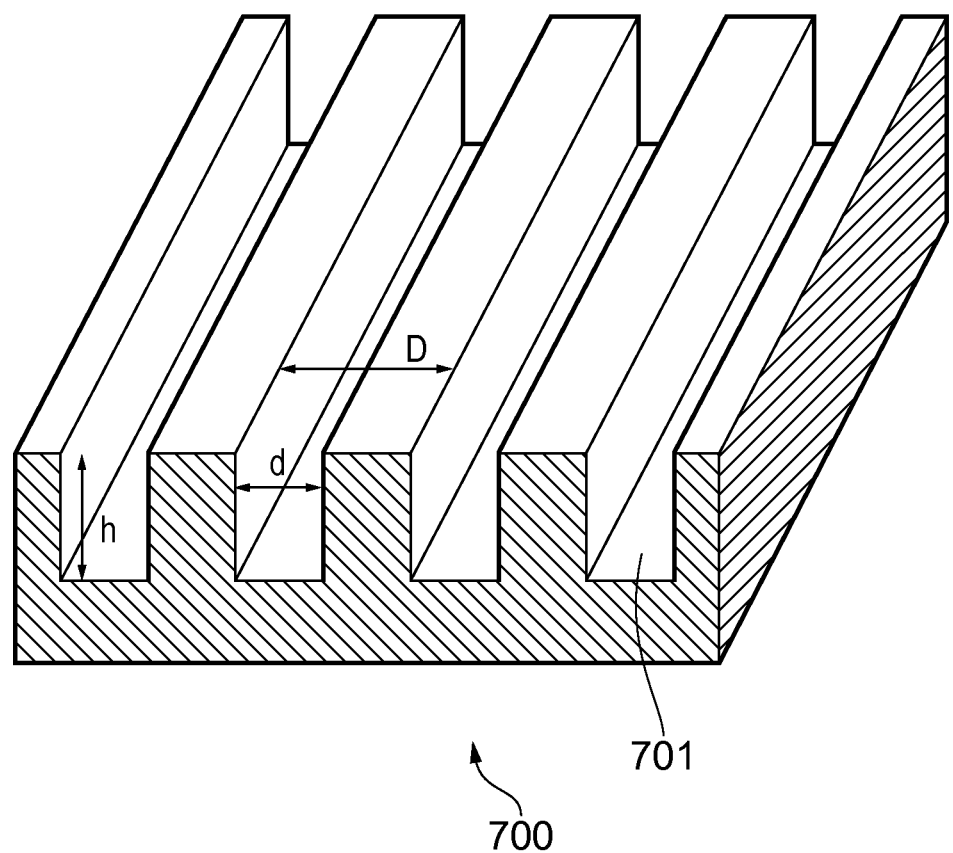
FIG. 7 shows a corrugated conductor in accordance with an embodiment of the present disclosure.

FIG. 7 shows an example of a corrugated surface 700. The surface includes a series of parallel grooves 701. The surface allows Zenneck wave propagation in a direction perpendicular to the grooves. The structure can be metallic (copper or aluminium) or can be a lighter/more flexible material where the corrugated surface is coated in a conductor (e.g. some form of metallic paint). Example parameters would be h=1.04 mm, d=1.04 mm and D=1.5 mm which provides an effective surface for Zenneck wave propagation at around 30 GHz.

For efficient coupling into the reactive surface, the field in the aperture of the coupler should ideally match the exponential decay rate of the surface wave field away from the surface. For a uniform aperture, its vertical extent should be no larger than the extent of the wave above the surface (where the power has dropped by around 20 dB from the surface). For example, at 23 GHz with surface reactance (Xs) of around 150 Ohms, the extent of the wave above the channel is around 1 cm. The transducer aperture should therefore be as close to the surface as possible and have a vertical extent of no greater than 1 cm. Where possible, the coupler should be matched to the surface for maximum power transfer. Two couplers that have proven to be effective are a monopole and a waveguide transition. Other possibilities are dipoles, patches and arrays.

There are various advantages of the dielectric channel described above. Spreading of waves is primarily in two dimensions across the surface. The surface is low loss when compared to other wireless alternatives (for example, around 2 dB/m at 23 GHz). Because the waves follow the reactive surface, physical non-line-of-sight communication is possible.

In the examples given above, communications between two nodes has been described. As communications nodes may be placed anywhere on the guiding medium, multi-node to multi-node connections are possible.

The systems described above may use very high bandwidths. For example, 23 to 33 GHz have been demonstrated. The systems described above may operate in a wide range of frequency bands. Zenneck waves demonstrate a high attenuation rate away from the surface. The attenuation is exponential. For example, 17 dB/cm at 23 GHz has been measured.

The channel does not need not be continuous. The Zenneck wave can transform to a space wave and can then re-couple to the surface at a later point.

The selection of the communication channel will depend on the targeted application. The following guidelines can be used:

| Requirement | Example channel choice |
| --- | --- |
| Flexibility | Dielectric coated conductor |
| Light weight | Dielectric coated conductor |
| Rigidity | Corrugated conductor |
| Higher frequencies (>10 GHz) | Corrugated conductor or dielectric coated conductor |
| Retro-fitting | Dielectric coated conductor |
| Multi-direction signals | Dielectric coated conductor |
| Single direction signals | Corrugated conductor |

For example, for the body centric networking example given above, a dielectric coated conductor is the preferred choice as a flexible dielectric layer can easily be incorporated into clothing.

The system could be used for communicating through pipes or wells. Here, a dielectric coating or corrugated conductor could be applied to the pipe wall. For high capacity wireless transmission of data over small and large electrical distances, a dielectric coated conductor, corrugations, or lumped inductances and capacitances could be used. For secure wireless transmission of data (e.g. machinery, in buildings, over ground sheets, over furniture, etc.), a dielectric coated conductor, corrugations, or lumped inductances and capacitances could be used.

Using the above described systems, various modes of networking are possible. For example, point-to-point, point-to-multi-point, multi-point-to-point, and multi-point-to-multi-point are all possible. The designed surface wave can have dual wide bandwidth (wide bandwidth at two centre frequencies utilising the designed surface by changing polarisation of couplers). In this document the term "surface wave" specifically refers to electromagnetic phenomena rather than, for example, optical or mechanical phenomena.

In contrast to the other surface waves, Zenneck surface waves are not used for long distance communication as they require a high impedance reactive surface to propagate effectively. These surfaces do not exist naturally but can be constructed. These waves are the most efficient at propagating as they do not have a radiating component to lose energy.

Power Transmission

The systems described above may also be used for power transfer. For example, a charging matt could be used to charge a device using the principles described above. Such a system may include a matt, the top layer of which includes a guiding medium such as those described above in connection with FIGS. 1 and 2. The system may also include a charging unit, which is a similar unit to those described above in connection with FIGS. 1 and 2, except the unit's purpose is to emit an electromagnetic wave for the purposes of power transfer. The system also includes a unit to be charged. For example this could be a cellular mobile device. This unit is placed on the matt and received the electromagnetic wave from the charging unit, thereby charging the device.

Sensing and Radar

The systems described above may also be used for sensing applications. For example, the system could be used in security applications to determine if an article is placed on a surface which is formed from the guiding medium noted above. A sensing unit is arranged to transmit a Zenneck wave across the surface. In the absence of any reflections of that wave, the sensor determines that no articles have been placed on the surface. If an article (such as an intruder, or an object placed by an intruder) is placed on the surface, the Zenneck wave is reflected back to the sensing unit, which detects the reflected wave. The sensing unit may then sound an alarm.

The invention claimed is:

1. A system comprising:
   a guiding medium having a first surface, the first surface having an electrical reactive impedance suitable for propagation of electromagnetic surface waves on the first surface; and
   at least two wave coupling nodes, the at least two wave coupling nodes each having a transmitter and/or receiver coupled to a transducer, the transducer of each of the at least two wave coupling nodes positioned on the first surface of said guiding medium, wherein the at least two wave coupling nodes are arranged to launch and/or receive the electromagnetic surface waves over the first surface the electromagnetic surface waves over the first surface of said guiding medium, and wherein the at least two wave coupling nodes are repositionable at arbitrary locations on the first surface of the guiding medium.

2. A system according to claim 1, wherein said guiding medium includes a dielectric layer and a conductive layer, a first surface of the dielectric layer being the first surface of the guiding medium and a second surface of the dielectric layer being positioned on or adjacent a first surface of the conductive layer.

3. A system according to claim 2, wherein the at least two wave coupling nodes include a dielectric layer having a first surface arranged to be positioned, in use, on the first surface of the dielectric layer of the guiding medium.

4. A system according to claim 3, wherein the at least two wave coupling nodes include a conductive layer positioned on or adjacent a second surface of the dielectric layer of the at least two wave coupling nodes.

5. A system according to claim 2, wherein the guiding medium is flexible.

6. A system according to claim 5, wherein the dielectric layer comprises a flexible dielectric and the conductive layer comprises a conductive woven mesh.

7. A system according to claim 1, further comprising an adhesive layer, wherein at least one of the at least two wave coupling nodes is adhered to said first surface by the adhesive layer.

8. A system according to claim 1, wherein said system is adapted to propagate radio communication using the electromagnetic surface waves and said at least two wave coupling nodes comprise communications nodes.

9. A system according to claim 1, wherein said electromagnetic surface waves are Zenneck surface waves, said electrical reactive impedance of the guiding medium is suitable for propagation of the Zenneck surface waves, and each of the at least two wave coupling nodes are arranged to launch and/or receive the Zenneck surface waves over the first surface of said guiding medium.

10. A system according to claim 9, wherein the electrical reactive impedance of the first surface comprises a surface reactance and a surface resistance, and the surface reactance is greater than the surface resistance.

11. A system according to claim 1, further comprising at least one sensor, coupled to at least one of said at least two wave coupling nodes.

12. A system according to claim 1, wherein at least one of said at least two wave coupling nodes is incorporated within a computing device.

13. A system according to claim 1, wherein said guiding medium comprises a corrugated conductor.

14. An article of clothing incorporating the system of claim 1.

15. An article of furniture incorporating the system of claim 1.

16. A building, vehicle or other vessel incorporating the system of claim 1.

17. A method comprising:
transmitting an electromagnetic surface wave along an electrically reactive first surface of a guiding medium from a first wave coupling node to a second wave coupling node, wherein the electromagnetic surface wave includes data modulated thereon, wherein the guiding medium is a flexible medium, and wherein the guiding medium is included in an article of clothing.

18. A method comprising:
positioning a first wave coupling node and a second wave coupling node at different arbitrary locations on an electrically reactive first surface of a guiding medium; and
transmitting an electromagnetic surface wave along the electrically reactive first surface of the guiding medium from the first wave coupling node to the second wave coupling node when the first wave coupling node and the second wave coupling node are positioned at the different arbitrary locations, wherein the electromagnetic surface wave includes data modulated thereon, and wherein the guiding medium is a flexible medium.

19. The method of claim 18, wherein the guiding medium is included in an article of furniture.

* * * * *